(12) United States Patent
Xie et al.

(10) Patent No.: US 11,868,003 B2
(45) Date of Patent: Jan. 9, 2024

(54) DRIVING BACKPLATE AND DISPLAY DEVICE

(71) Applicants: BOE MLED TECHNOLOGY CO., LTD., Beijing (CN); BOE TECHNOLOGY GROUP CO., LTD., Beijing (CN)

(72) Inventors: Junjie Xie, Beijing (CN); Yezhou Tan, Beijing (CN); Zhenxing Luo, Beijing (CN); Bin Xiang, Beijing (CN); Pei Li, Beijing (CN); Pengjun Cao, Beijing (CN)

(73) Assignees: BOE MLED TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 212 days.

(21) Appl. No.: 17/477,133

(22) Filed: Sep. 16, 2021

(65) Prior Publication Data
US 2022/0269131 A1 Aug. 25, 2022

(30) Foreign Application Priority Data
Feb. 19, 2021 (CN) .......................... 202110192044.9

(51) Int. Cl.
*G02F 1/13357* (2006.01)

(52) U.S. Cl.
CPC .. *G02F 1/133605* (2013.01); *G02F 1/133603* (2013.01); *G02F 1/133608* (2013.01)

(58) Field of Classification Search
CPC ......... G02F 1/133605; G02F 1/133603; G02F 1/133608

USPC .......................................................... 349/67
See application file for complete search history.

(56) References Cited

U.S. PATENT DOCUMENTS

2012/0063150 A1* 3/2012 Takeuchi .................. G09F 9/33
362/308
2020/0089051 A1* 3/2020 Watanabe ......... G02F 1/133345

FOREIGN PATENT DOCUMENTS

| CN | 201885056 U | 6/2011 |
| CN | 103872220 A | 6/2014 |
| CN | 108983497 A | 12/2018 |
| CN | 110632790 A | 12/2019 |
| CN | 111785769 A | 10/2020 |

(Continued)

OTHER PUBLICATIONS

Second Office Action & Search Report dated Nov. 29, 2022 relating to CN Patent Application No. 202110192044.9.

(Continued)

*Primary Examiner* — Charles S Chang
(74) *Attorney, Agent, or Firm* — DINSMORE & SHOHL LLP

(57) ABSTRACT

The embodiments of the present disclosure provide a driving backplate and a display device adopting the following solutions. The driving backplate comprises: a substrate; a first reflective layer disposed on the substrate; the first reflecting layer is provided with a plurality of first openings; an outline of the first opening comprises a plurality of first grooves; a functional element disposed within the first opening; and a dispensed portion arranged at a periphery of the functional element, and at least part of the first groove is filled by one side of the dispensed portion close to the first reflecting layer.

18 Claims, 16 Drawing Sheets

(56) References Cited

FOREIGN PATENT DOCUMENTS

| CN | 112198713 A | 1/2021 |
|---|---|---|
| JP | 2018032586 A | 3/2018 |

OTHER PUBLICATIONS

Chinese First Office Action dated Jun. 29, 2022, relating to CN Patent Application No. 202110192044.9.

* cited by examiner

311

C-C

D-D

F-F

G-G

DRIVING BACKPLATE AND DISPLAY DEVICE

CROSS-REFERENCE TO RELATED APPLICATIONS

The present application claims the priority to the Chinese patent application No. 202110192044.9 filed on Feb. 19, 2021, which is hereby fully incorporated herein by reference in its entirety.

TECHNICAL FIELD

The present disclosure relates to a driving backplate and a display device.

BACKGROUND

An LED (Light Emitting Diode) has the advantages of small size, high brightness, low power consumption, less heat generation, long service life, environmental friendliness, and the like, and plays an indispensable role as a backlight source in electronic products such as mobile phones, televisions, computers, and the like which require backlight display.

Taking a Mini-LED as an example, the Mini-LED has many advantages such as being ultra-thin, High brightness, energy-saving, extremely narrow frame, HDR (High-Dynamic Range), and wide color gamut, and becomes a hot spot in current market development.

SUMMARY

The embodiments of the present disclosure provide a driving backplate and a display device adopting the following solutions.

One aspect of the present disclosure provides a driving backplate comprising: a substrate; a first reflective layer disposed on the substrate; the first reflective layer is provided with a plurality of first openings; an outline of the first opening comprises a plurality of first grooves; a functional element disposed within the first opening; and a dispensed portion arranged at a periphery of the functional element, and at least part of the first groove is filled by one side of the dispensed portion close to the first reflective layer.

Alternatively, at least a portion of the dispensed portion overlaps the first reflective layer.

Alternatively, a gap is formed between the dispensed portion and the functional element.

Alternatively, the driving backplate further comprises at least one second reflective layer; the second reflective layer is arranged on one side of the first reflective layer away from the substrate; the second reflective layer is provided with a plurality of second openings, the second openings are opposite to the first openings, and the outline of the second opening is larger than that of the first opening.

Alternatively, the outline of the second opening comprises a plurality of second grooves which may extending through the second reflective layer.

Alternatively, the first grooves are in an equally spaced arrangement.

Alternatively, the plurality of the first grooves are shaped as at least one of rectangular grooves, semicircular grooves, or trapezoidal grooves.

Alternatively, the second grooves are in an equally spaced arrangement.

Alternatively, the plurality of the second grooves are shaped as at least one of rectangular grooves, semicircular grooves, or trapezoidal grooves.

Alternatively, the first grooves and the second grooves are arranged in a staggered manner.

Alternatively, the at least one second reflective layer has a plurality of second reflective layers; the distance from the outline of the second opening of each of the plurality of second reflective layers to the functional element increases in the direction away from the substrate.

Alternatively, the first reflective layer is a white ink layer or a white reflective layer.

Another aspect of the present disclosure provides a display device comprising the driving backplate according to the first aspect.

BRIEF DESCRIPTION OF THE DRAWINGS

In order to more clearly illustrate the technical solutions in the embodiments of the present disclosure, the drawings to be used in the description of the embodiments are briefly introduced below, and it is apparent that the drawings in the description below are only some embodiments of the present disclosure, and it is obvious for those skilled in the art that other drawings may be obtained according to these drawings without creative work.

FIG. 6b is a cross-sectional view taken along the direction A-A of FIG. 6a;

FIG. 7e is a cross-sectional view taken along the direction B-B of FIG. 7a;

FIG. 8c is a cross-sectional view taken along the direction C-C of FIG. 8a;

FIG. 11b is a cross-sectional view taken along the direction E-E of FIG. 11a;

FIG. 11c is a cross-sectional view taken along the direction F-F of FIG. 11a;

FIG. 11d is a cross-sectional view taken along the direction G-G of FIG. 11a.

DETAILED DESCRIPTION

The technical solutions in the embodiments of the present disclosure will be described clearly and completely with reference to the drawings in the embodiments of the present disclosure. It is obvious that the embodiments described are only some embodiments of the present disclosure, rather than all embodiments. All other embodiments, which can be derived by the person skilled in the art from the embodiments disclosed herein without making any creative effort, shall fall within the protection scope of the present disclosure.

The embodiment of the present application provides a display device 100, and the display device 100 according to the embodiment of the present application may comprises, for example, a tablet computer, a mobile phone, an electronic reader, a remote controller, a personal computer (PC), a notebook computer, a personal digital assistant (PDA), vehicle-mounted equipment, a network television, wearable equipment, a television and other intelligent equipment with network functions. In the embodiment of the present application, the specific form of the display device 100 is not particularly limited, and for convenience of description, the mobile phone is taken as an example of the display device 100.

Figure 1A:
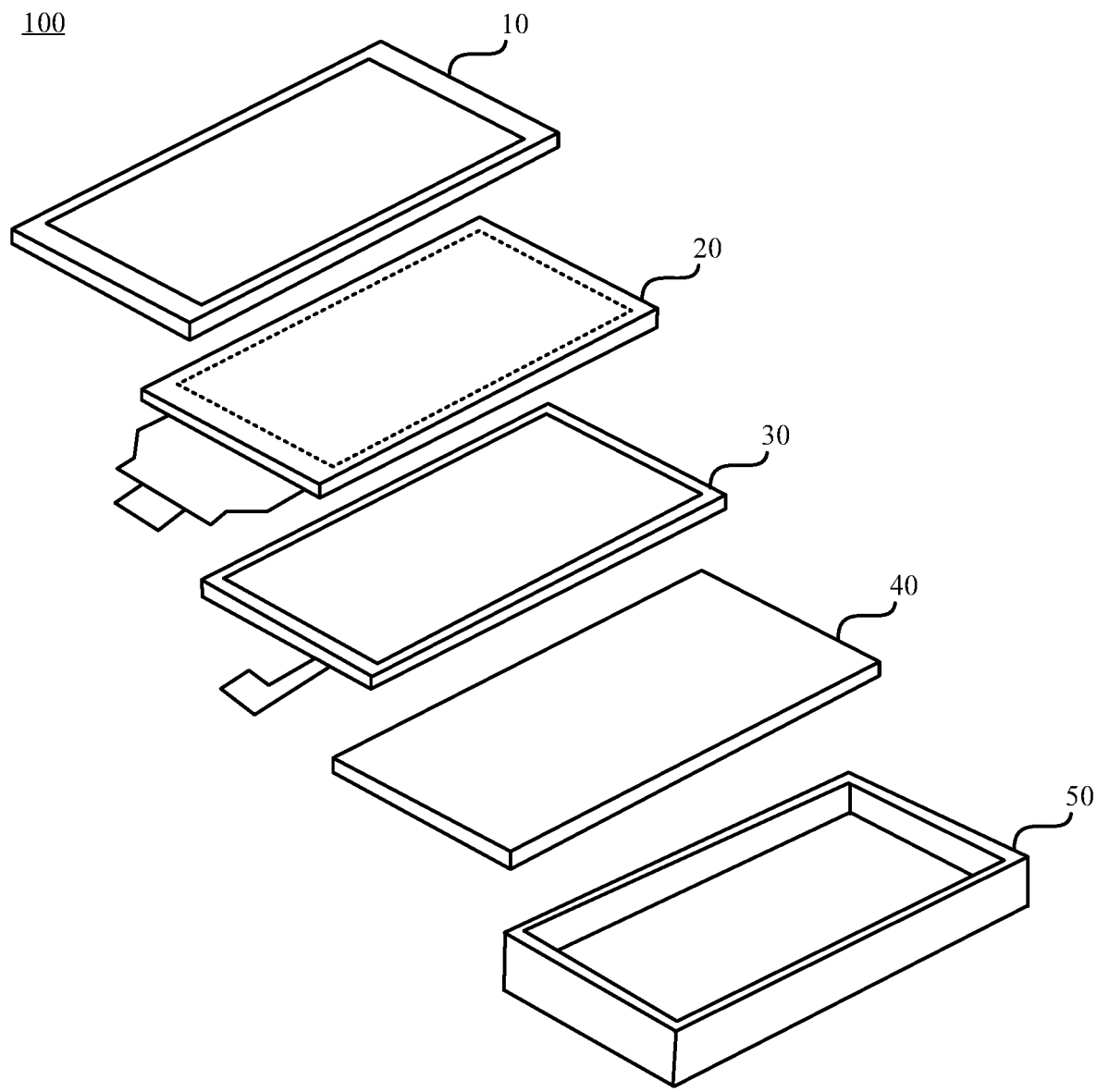
FIG. 1a is a schematic structural diagram of a display device provided in an embodiment of the present application.

As shown in FIG. 1a, the display device 100 mainly includes a cover plate 10, a liquid crystal display panel 20, a backlight 30, a middle frame 40, and a case 50, wherein the liquid crystal display panel 20, the backlight 30, and the middle frame 40 are disposed in the case 50.

Figure 1B:
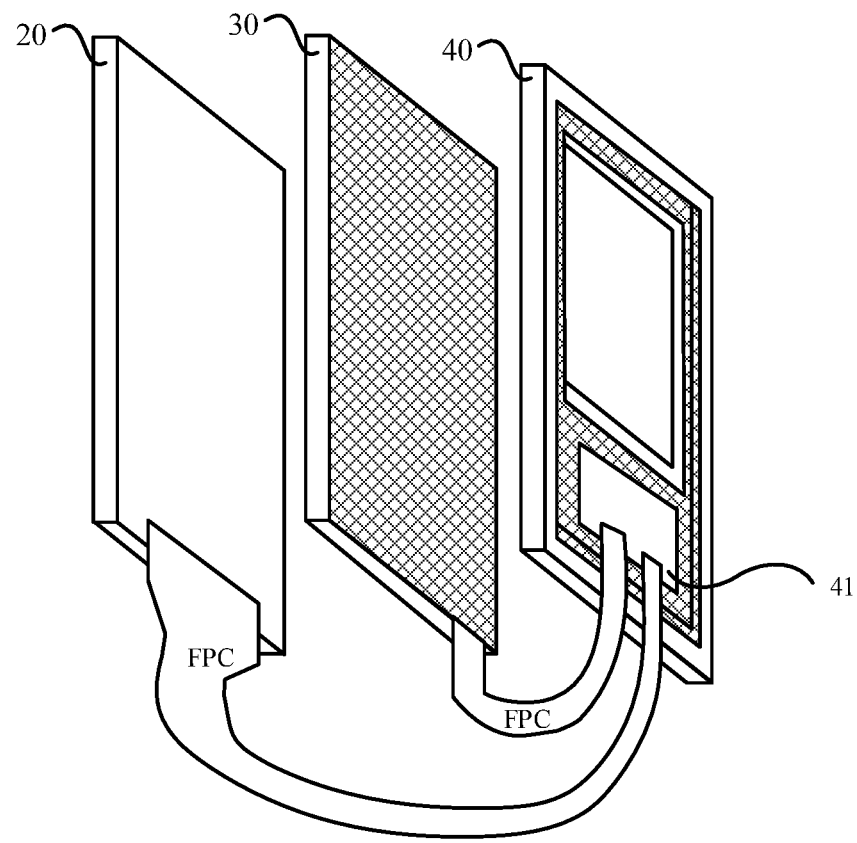
FIG. 1b is a schematic view illustrating a connection manner between a display panel, a backlight source and a middle frame provided in an embodiment of the present application.

As shown in FIG. 1b, the middle frame 40 is disposed between the backlight 30 and the case 50. The surface of the middle frame away from the backlight 30 is used for mounting internal components such as a main board 41, and the main board 41 may be, for example, a printed circuit board (PCB). The main board 41 is used to supply electrical signals to the backlight 30 and the liquid crystal display panel 20, and the liquid crystal display panel 20 and the backlight 30 are electrically connected to the main board 41 through a flexible printed circuit (FPC).

The liquid crystal display panel 20 has a light-emitting side where the displayed image can be seen and a back side opposite to the light-emitting side. The cover plate 10 is located on the light-emitting side of the liquid crystal display panel 20 for protecting the liquid crystal display panel 20, and the cover plate 10 and the liquid crystal display panel 20 can be bonded by an optically clear adhesive (OCA).

The cover plate 10 may be, for example, cover glass (CG), which may have a certain toughness.

Figure 1C:
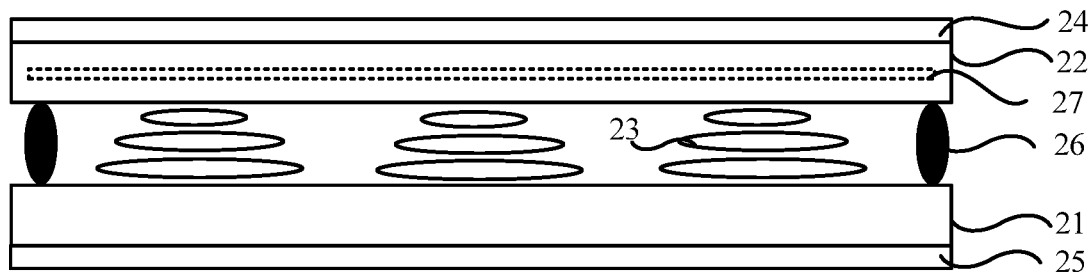
FIG. 1c is a schematic structural diagram of a display panel provided in an embodiment of the present application.

As shown in FIG. 1c, the liquid crystal display panel 20 includes an array substrate 21, a counter substrate 22, a liquid crystal layer 23, an upper polarization layer 24, and a lower polarization layer 25. The liquid crystal layer 23 is provided between the array substrate 21 and the counter substrate 22. The array substrate 21 and the counter substrate 22 are bonded together by the sealant 26, so that the liquid crystal layer 23 is confined in a liquid crystal cell surrounded by the array substrate 21, the counter substrate 22, and the sealant 26.

In order to enable the liquid crystal display panel 20 to realize color display, as shown in FIG. 1c, the liquid crystal display panel 20 further includes a color filter layer 27. The color filter layer 27 may be disposed on the counter substrate 22, and in this case, the counter substrate 22 may be referred to as a color filter substrate.

The backlight 30 is disposed at the back of the liquid crystal display panel 20 and provides light to the liquid crystal display panel 20.

The display principle of the display device 100 is as follows: the white light is emitted from the backlight 30, is polarized in a specific polarization direction by the lower polarization layer 25, then enters the array substrate 21, and is filtered by the liquid crystal layer 23 and the color filter layer on the counter substrate 22 to form polarized lights of three primary colors of red, green, and blue.

When the polarization direction of the polarized light is perpendicular to the polarization direction of the upper polarization layer 24, the polarized light cannot pass through the upper polarization layer 24, and no light exits.

When the polarization direction of the polarized light is parallel to the polarization direction of the upper polarization layer 24, the polarized light can pass through the upper polarization layer 24, and the light intensity of the emergent light is strongest at this time.

Since the liquid crystal molecules in the liquid crystal layer 23 have a rotation property for polarized light, a specific orientation of the molecules may change the polarization direction of the polarized light. The deflection direction of the liquid crystal molecules in the sub-pixels is changed by the driving signals transmitted to the sub-pixels (sub-pixels) through the pixel circuits on the array substrate 21, so that the polarization direction of the light rays emitted by the sub-pixels is changed. Therefore, the angle between the polarized light and the upper polarization layer 24 can be controlled, and the quantity of the light rays emitted from the upper polarization layer 24 in each sub-pixel is controlled, so that different gray scale images can be displayed.

As can be seen from the above description of the display principle of the display device 100, the display effect of the display device 100 is closely related to the brightness of the light source provided by the backlight 30.

Figure 2A:
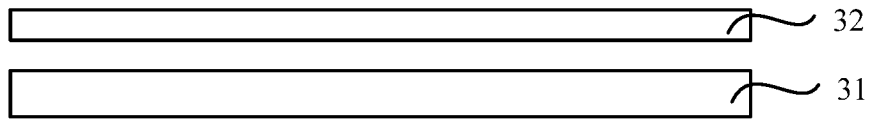
FIG. 2a is a schematic structural diagram of a backlight source provided in an embodiment of the present application.

The embodiment of the present application further provides a backlight 30, as shown in FIG. 2a, which includes a driving backplate 31 and an optical film layer 32 disposed on a light-emitting side of the driving backplate 31.

Figure 2B:
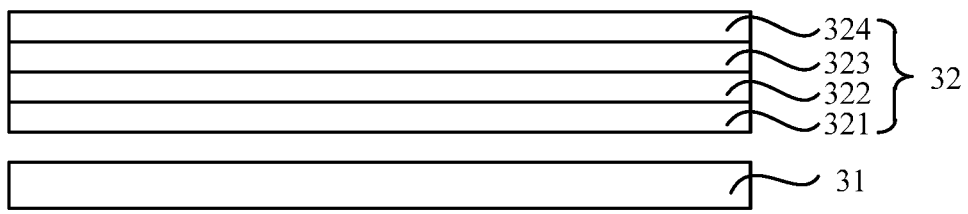
FIG. 2b is a schematic structural diagram of another backlight source provided in an embodiment of the present application.

In one possible embodiment, as shown in FIG. 2b, the driving backplate 31 is a blue light driving backplate, and the optical film layer 32 includes a transflective film 321, a quantum dot (QD)/fluorescent film 322, a diffusion sheet 323, and a prism sheet 324. The transflective film 321 and the QD/fluorescent film 322 are color conversion films of the blue light driving backplate, and can realize incidence of blue light and emission of white light. The diffusion sheet 323 plays a role of light mixing, and the prism sheet 324 can increase brightness in a front view angle direction.

Figure 2C:
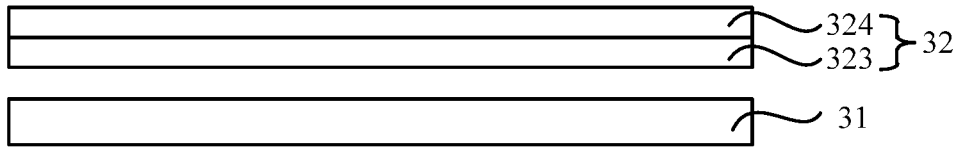
FIG. 2c is a schematic structural diagram of still another backlight source provided in an embodiment of the present application.

In another possible embodiment, as shown in FIG. 2c, the driving backplate 31 is a white light driving backplate, and the optical film layer 32 includes a diffusion sheet 323 and a prism sheet 324. Since it is not necessary to convert color light into white light, it is not necessary to provide the transflective film 321 and the QD/fluorescent film 322 above the driving backplate 31.

As can be seen from the above description, in the backlight 30, the optical film layer 32 plays a role of dimming, and the driving backplate 31 is used for providing a light source. The brightness of the backlight 30 is closely related to the brightness of the light source provided by the driving backplate 31.

The embodiment of the present application further provides a driving backplate 31, as shown in FIG. 4a, including a substrate 311, a first reflective layer 312, a functional element 313, and a dispensed portion 314.

Figure 3A:
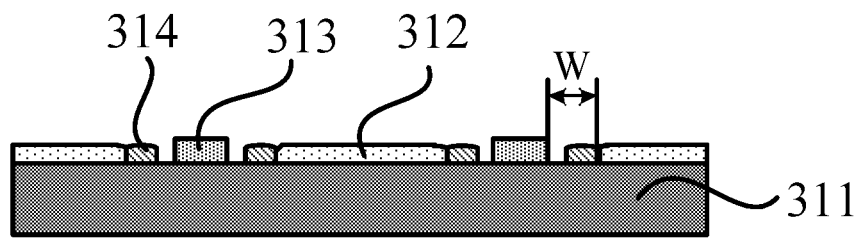
FIG. 3a is a schematic structural diagram of a driving backplate provided in an embodiment of the present application.
Figure 3B:
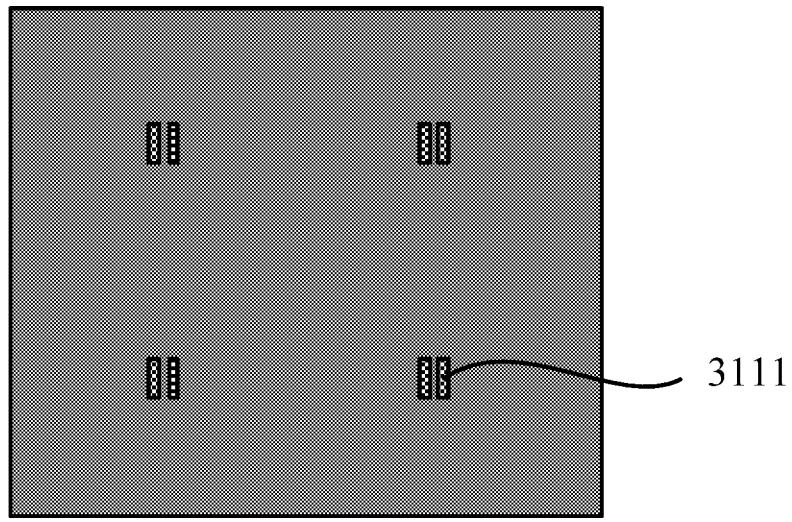
FIG. 3b is a schematic structural diagram of a substrate provided in an embodiment of the present application.

As shown in FIG. 3b, a plurality of pads 3111 are arranged in an array on the surface of the substrate 311, and the pads 3111 are used for die bonding with the functional element 313.

The structure of the substrate 311 is not limited in the embodiments of the present application, and the substrate 311 may be, for example, a PCB substrate or an FPC substrate. Alternatively, the substrate 311 may be a substrate formed by providing a conductive member on a glass substrate.

The substrate 311 may have a single structure as shown in FIG. 3b, or may be formed by joining a plurality of sub-substrates.

The functional element 313 and the pad 3111 are die-bonded in one-to-one correspondence, so that the functional element 313 and the pad 3111 are electrically connected. Based on this, the functional elements 313 provided on the substrate 311 are arranged in a regular array.

The functional element 313 may be, for example, an LED package chip. For example, the functional element 313 may be a blue LED package chip (e.g., a blue Mini-LED package chip), in which case the driving backplate 31 is a blue driving backplate. Alternatively, the functional element 313 may be, for example, a white LED package chip (e.g., a white Mini-LED package chip), in which case the driving backplate 31 is a white driving backplate.

Figure 4:
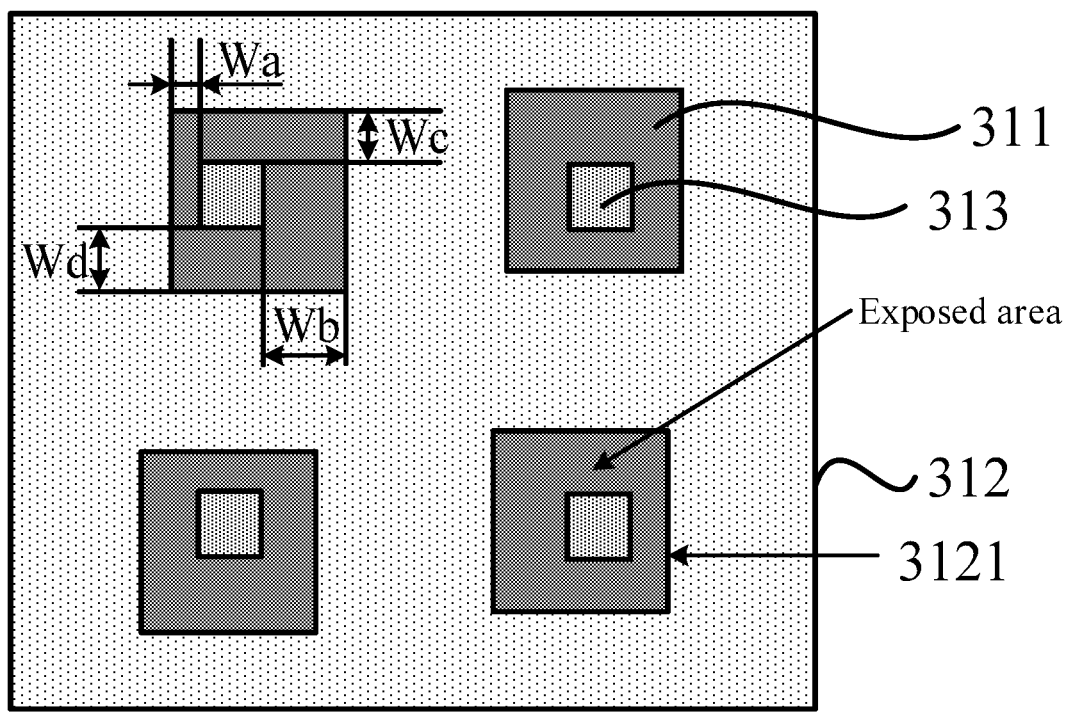
FIG. 4 is a diagram illustrating a positional relationship between a first reflective layer and a functional element provided in an embodiment of the present application.

The first reflective layer 312 is disposed on the substrate 311. As shown in FIG. 4, the first reflective layer 312 has a plurality of first openings 3121, and the first openings 3121 expose the functional element 313 as a window area for die bonding of the functional element 313.

In one possible embodiment, the first reflective layer 312 is a white ink layer.

As for the manner of preparing the white ink layer, for example, the white ink layer is formed by a steel mesh printing method. For example, by forming an opening in the printing steel mesh, the non-open area of the printing steel mesh corresponds to the first open area of the white ink layer, and the open area of the printing steel mesh corresponds to the area where the solid portion of the white ink layer is to be formed. Then, white ink is coated on the surface of the printing steel mesh, and the white ink leaks from the opening of the printing steel mesh so as to form a white ink layer.

In another possible embodiment, the first reflective layer 312 is a white reflective layer. For example, a white reflective film is formed, an opening is punched in the white reflective film to form a first opening 3121 corresponding to a window region of the functional element 313 to form a white reflective layer, and then the white reflective layer is attached to the substrate 311.

However, no matter whether the white ink layer is formed by the printing steel mesh (by blocking the windowing region for the die bonding of the functional element 313), or the white reflective layer is formed by punching an opening on the white reflective film, in the manufacturing process, due to the tolerance existing in the steps of manufacturing the steel mesh, printing the white ink, aligning, transferring, and the like, there is a certain accumulated tolerance in the finally formed first opening 3121 of the first reflective layer 312.

For example, as shown in FIG. 4, taking the first opening 3121 as a rectangle as an example, the theoretical value of the distance from each side of the first opening 3121 to the edge of the functional element 313 is W (see FIG. 3a). However, because the deviation of the white ink printing, the manufacturing deviation of the printing steel mesh, or the deviation of the white reflective layer transfer is non-directional and irregular, the distances from the sides of the first opening 3121 to the edge of the functional element 313 are not completely equal. That is, the distances from the respective sides of the first opening 3121 to the edge of the functional element 313 are Wa, Wb, Wc, Wd, respectively, and Wa, Wb, Wc, Wd are not completely equal.

When preparing the driving backplate 31, the first reflective layer 312 is formed first, and then the functional element 313 and the pad 3111 are die bonded. Therefore, in order to prevent the bonding pad 3111 on the substrate 311 from being covered by the white ink due to the deviation of the white ink printing or the deviation of the white reflective layer transfer, and thus the die bonding is not possible, a person skilled in the art would generally make the size of the first opening 3121 large.

However, since the first opening 3121 of the first reflective layer 312 exposes the substrate 311, the reflective effect cannot be obtained at the area of the first opening 3121 (the substrate 311 has no reflective function). Therefore, if the size of the first opening 3121 is too large, the reflectivity of the area will be low, and the reflection effect of the first reflective layer 312 will be affected, and the optical effect of the driving backplate 31 will be affected.

Figure 5:
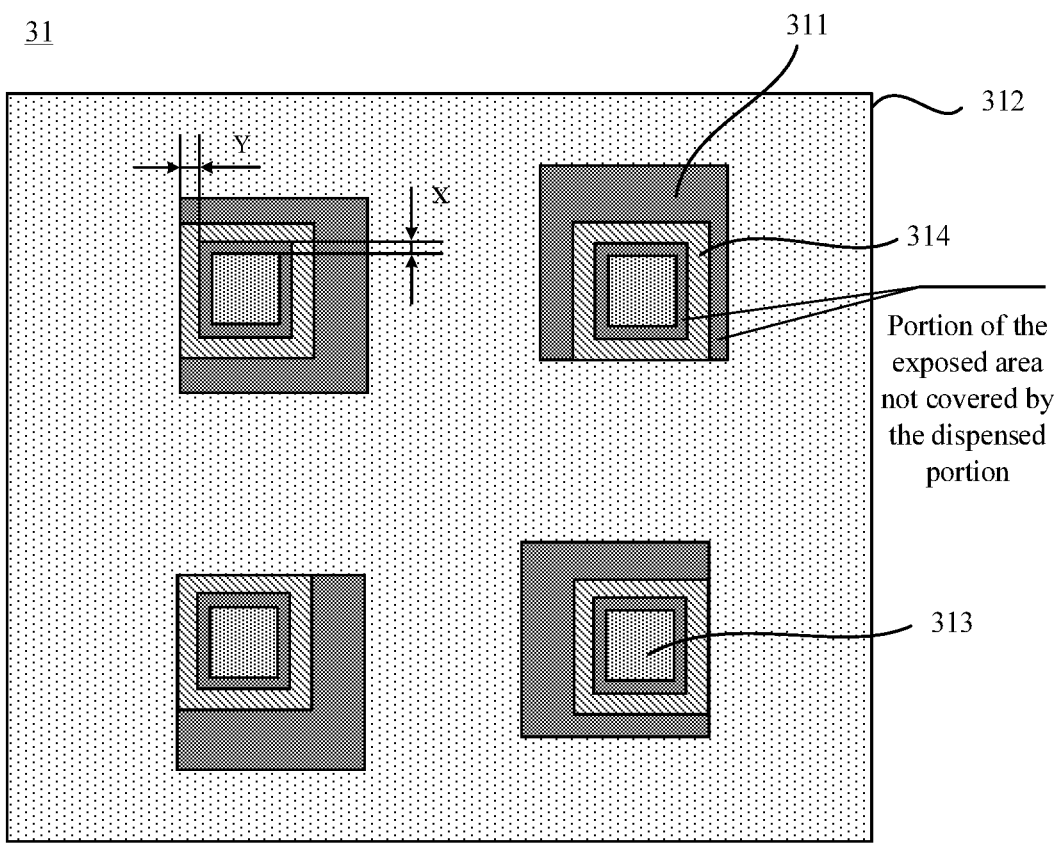
FIG. 5 is a top view of a driving plate provided in an embodiment of the present application.

Based on this, as shown in FIG. 5, the driving backplate 31 further includes a dispensed portion 314, and the dispensed portion 314 is disposed at the periphery of the functional element 313.

The dispensed portion 314 is made of glue with high reflection performance. In some embodiments, the reflectivity of the material of the dispensed portion 314 is greater than 85%. For example, the reflectivity of the material of the dispensed portion 314 is greater than 87%, 90%, 93%, 95% and 97%.

When the driving backplate 31 is prepared, the dispensed portion 314 is formed after the functional element 313 and the pad 3111 are die-bonded. In order to prevent the dispensed portion 314 from covering the functional element 313, the light emission efficiency of the functional element 313 is affected. The distance X from the edge of the dispensed portion 314 to the functional element 313 should be greater than or equal to 0. The setting of the value X is related to the processing capacity of the dispenser and can be set according to actual conditions. It is understood that the size of X should be as small as possible to improve the reflection efficiency of the dispensed portion 314.

Since the deviation of the first opening 3121 has no directionality, it is not possible to correct the deviation one by one and perform dispensing. In general, during the process of forming the dispensed portion 314, dispensing is performed uniformly (dispensing position and dispensing amount are consistent) on the exposed area between the side of the first opening 3121 and the functional element 313. That is, the dispensed portions 314 formed by dispensing are also arranged on the substrate 311 in a regular array.

In order to ensure the distance X from the edge of the dispensed portion 314 to the functional element 313 and prevent the dispensed portion 314 from excessively overlapping the first reflective layer 312. In the embodiment of the present application, the width of the dispensed portion 314 is selected as Y to achieve the above purpose. That is, X+Y Wa, Wb, Wc, and Wd. Taking Wa as an example, in the case of X+Y=Wa, the exposed area from the side of the first opening 3121 to the edge of the functional element 313 is just completely covered by the dispensed portion 314. In the case of X+Y<Wa, the exposed area from the side of the first opening 3121 to the edge of the functional element 313 is not completely covered by the dispensed portion 314, and a partial area is still exposed, resulting in poor reflectivity uniformity of each exposed area.

Figure 6A:
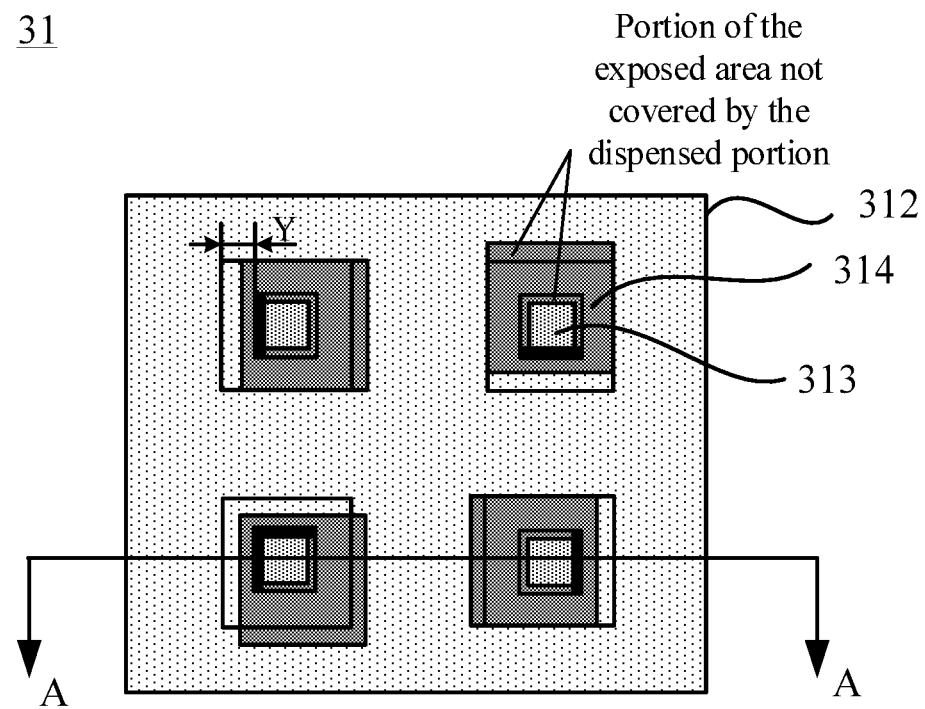
FIG. 6a is a top view of another driving plate provided in an embodiment of the present application.

In order to solve the above problem, as shown in FIG. 6a, an embodiment of the present invention further provides a structure of the dispensed portion 314, in which the width Y of the dispensed portion 314 is increased to increase the coverage of the dispensed portion 314 on the exposed area.

Figure 6B:
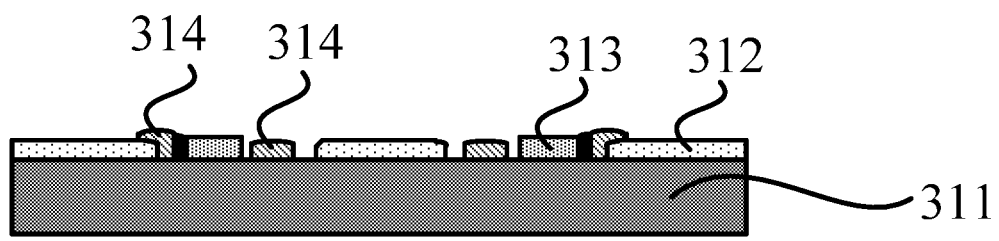

However, as shown in FIG. 6b (a cross-sectional view taken along the direction A-A of FIG. 6a), the dispensing position is theoretically determined such that the distance X between the edge of the dispensed portion 314 and the functional element 313 is satisfied during dispensing. Then, when the width Y of the dispensed portion 314 is increased, if the distance between the side of the first opening 3121 and the edge of the functional element 313 is not large enough, the dispensed portion 314 may be overlapped on the first reflective layer 312 as shown in FIG. 6b.

That is, during dispensing, a portion of the dispensing glue overlaps the first reflective layer 312, and a portion of the dispensing glue is located in the first opening 3121. Due to the large layer thickness of the first reflective layer 312, a step difference is formed between the glue overlapping the first reflective layer 312 and the glue located in the first opening 3121. During the curing process of the dispensing glue, the dispensing glue is liable to overflow from the high side (the dispensing glue overlapped on the first reflective layer 312) to the low side (the dispensing glue located in the first opening 3121), so that the actual distance from the functional element 313 to the edge of the dispensing glue is smaller than X, even covering the functional element 313, thereby causing the functional element 313 to emit light poorly.

Figure 7A:
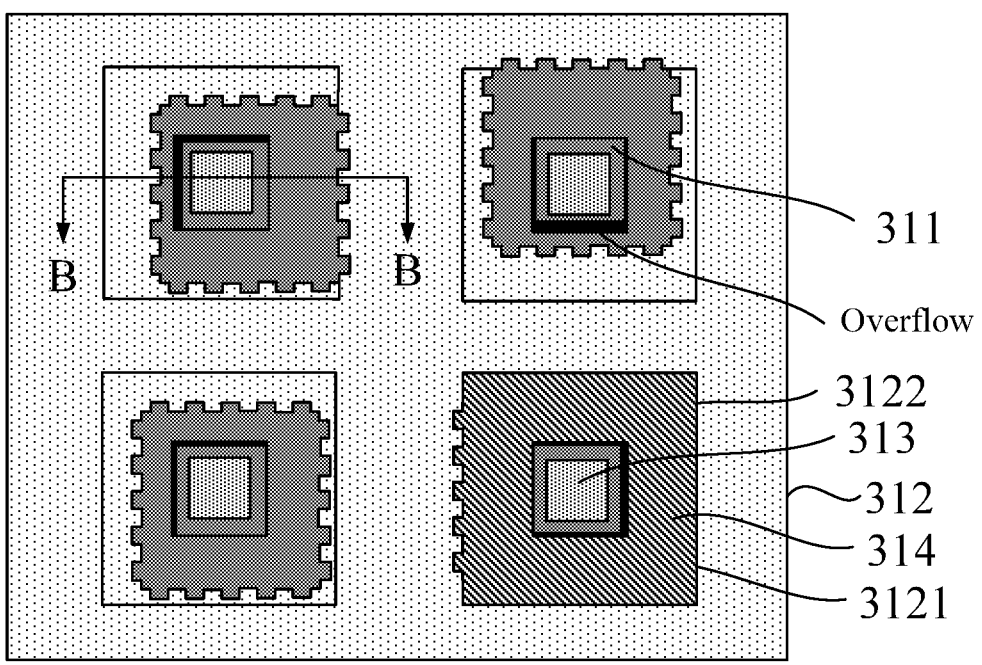
FIG. 7a is a top view of another driving plate provided in an embodiment of the present application.

In order to solve the above technical problem, an embodiment of the present invention further provides a driving backplate 31, as shown in FIG. 7a, including a substrate 311, a first reflective layer 312, a functional element 313, and a dispensed portion 314.

The structure of the substrate 311 may be the same as described above, and reference may be made to the description related to FIG. 3b. The structure of the functional element 313 may also be the same as the structure of the functional element 313 in the driving backplate 31 illustrated in FIG. 3a, and is not described herein again.

Figure 7B:
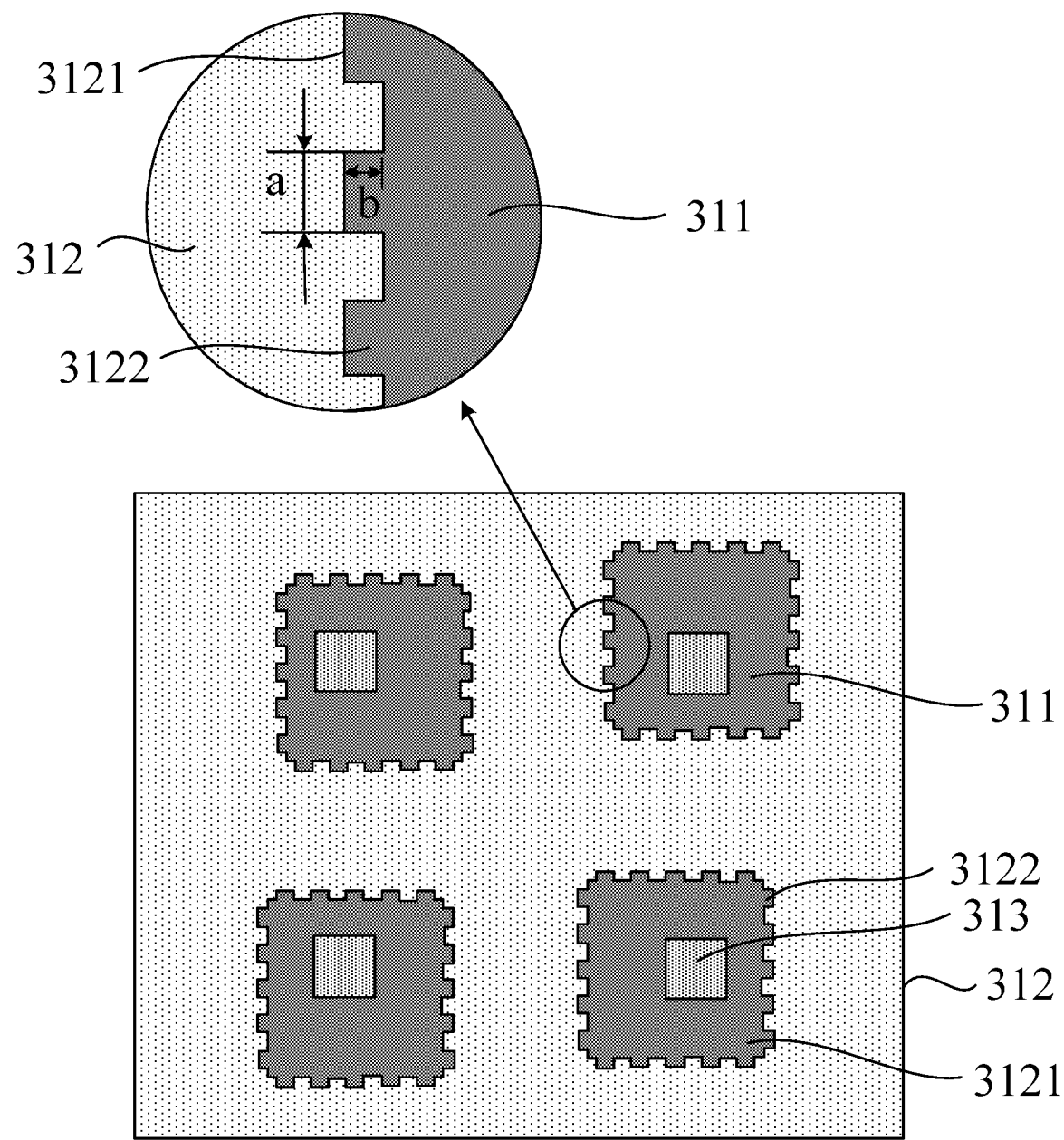
FIG. 7b is a schematic structural diagram of a first opening provided in an embodiment of the present application.

The first reflective layer 312 is disposed on the substrate 311. As shown in FIG. 7b, the first reflective layer 312 has a plurality of first openings 3121, and the first openings 3121 have an outline including a plurality of first grooves 3122. The outline of the first opening 3121 refers to a shape enclosed by the periphery of the first opening 3121 in a plan view looking down on the first reflective layer 312. The first groove 3122 refers to the recess of outline of the first opening 3121 in a direction from the inside of the first opening 3121 to the outside of the first opening 3121 in a plan view looking down on the first reflective layer 312.

The material and preparation method of the first reflective layer 312 may be the same as those described above. For example, the first reflective layer 312 may be a white ink layer or a white reflective layer.

For example, the first groove 3122 is an open groove, or it is understood that the first groove 3122 penetrates through the first reflective layer 312. That is, the first groove 3122 extends in the layer thickness direction of the first reflective layer 312, both ends of the first groove 3122 in the extending direction of the first groove 3122 are open, and the groove bottom of the first groove 3122 intersects (e.g., is perpendicular to) the substrate 311.

Figure 7C:
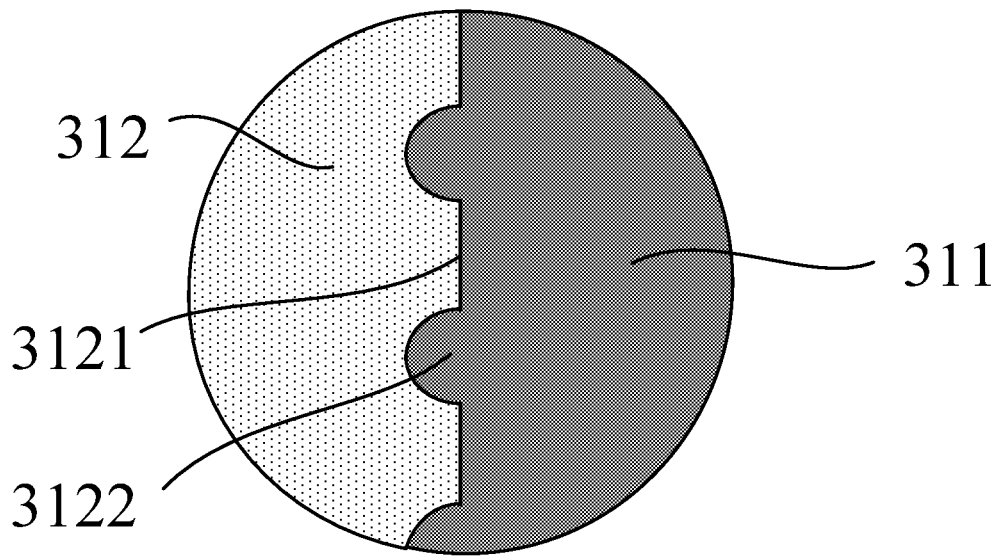
FIG. 7c is a schematic view of another first opening provided in an embodiment of the present application.
Figure 7D:
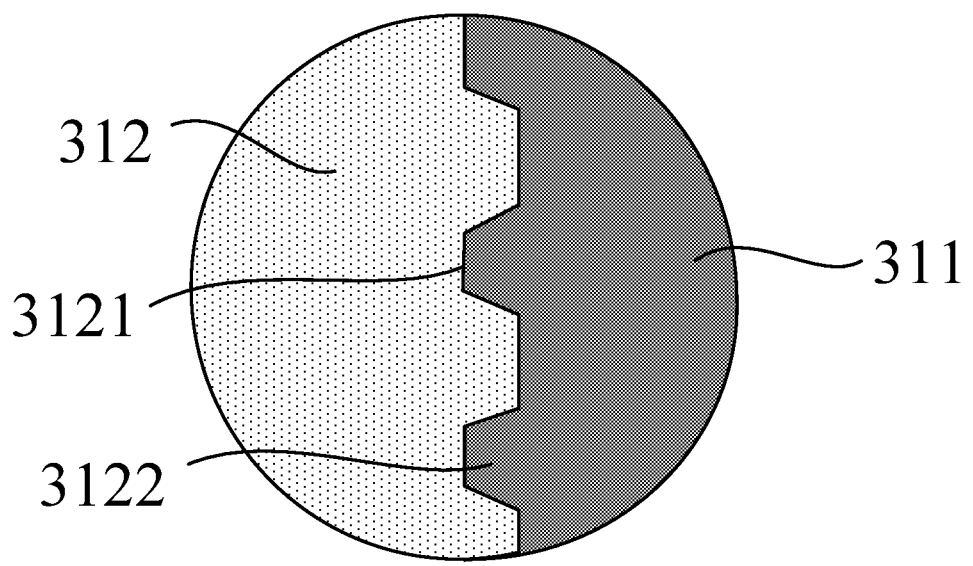
FIG. 7d is a schematic diagram of a structure of another first opening provided in an embodiment of the present application.

In the embodiment of the present application, the shape of the first groove 3122 is not limited, and FIG. 7b only illustrates that the first groove 3122 as a rectangular groove as an example. The first groove 3122 may be a semicircular groove (as shown in FIG. 7c) or any polygonal groove such as a trapezoidal groove (as shown in FIG. 7d).

In addition, the groove width a and the groove depth b of the first groove 3122 are related to the deviation amount of the first opening 3121, and may be determined in connection with an actual process of a product.

Regarding the arrangement of the first grooves 3122 on the outline of the first opening 3121, in order to reduce the process difficulty, in one possible embodiment, as shown in FIG. 7b, the first grooves 3122 are arranged in an equally spaced arrangement. Alternatively, the first grooves 3122 may not be regularly arranged.

In addition, regarding the kind of the first groove 3122 on the outline of the first opening 3121, in order to reduce the process difficulty, in one possible embodiment, as shown in FIG. 7b, the plurality of first grooves 3122 on the outline of the first opening 3121 have the same shape. Alternatively, the shapes of the plurality of first grooves 3122 may not be identical.

As shown in FIG. 7a, the dispensed portion 314 is disposed at the periphery of the functional element 313, and a side of the dispensed portion 314 close to the first reflective layer 312 fills at least a portion of the first groove 3122 (FIG. 7a illustrates an example in which the dispensed portion 314 fills the entire first groove 3122).

A side of the dispensed portion 314 close to the first reflective layer 312 fills at least a portion of the first groove 3122, and it is understood that the dispensed portion 314 may not fill the entire first groove 3122, and may fill the entire first groove 3122.

The setting of the distance X between the outline of the dispensed portion 314 and the functional element 313 is the same as described above. For example, the distance X between the outline of the dispensed portion 314 and the functional element 313 is ≥0.

Considering that there may be difference in such as the dispensing environment and the like in the dispensing process, the dispensing precision has slight deviation. In one possible embodiment, there is a gap (i.e., X>0) between the outline of the dispensed portion 314 and the functional element 313. Of course, it is understood that the size of X should be as small as possible to improve the reflective efficiency of the dispensed portion 314.

On this basis, it is considered that the intervals between the respective sides of the first opening 3121 and the edges of the functional element 313 are not completely equal. In one possible embodiment, in order to apply the related dispensing process (i.e. uniform dispensing during dispensing), as shown in FIG. 7a, at least a portion of the dispensed portion 314 overlaps the first reflective layer 312.

Taking the dispensed portion 314 as a "loop" shape shown in FIG. 7a as an example, at least a portion of the dispensed portion 314 is overlapped with the first reflective layer 312, for example, one or more sides of the dispensed portion 314 may be overlapped with the first reflective layer 312.

Since the widths Y of the dispensed portions 314 formed by the related dispensing process are equal, the following two situations may occur.

Figure 7E:
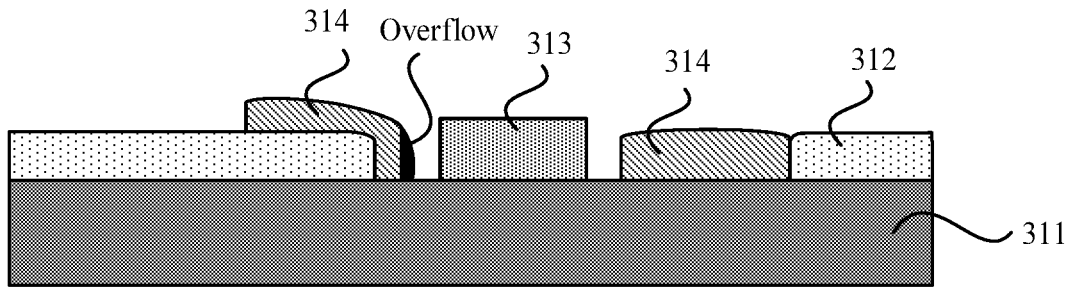

As the first situation, as shown in FIG. 7e (the cross-sectional view taken along the direction B-B in FIG. 7a), the dispensed portion 314 is located at the left side of the functional element 313, the dispensed portion 314 overlaps the first reflective layer 312, and the dispensing glue overflows towards the functional element 313 due to the height difference between the dispensing glue overlapping the first reflective layer 312 and the dispensing glue located in the first opening 3121.

In FIG. 7e, the glue overflowing portion and the non-glue overflowing portion of the dispensed portion 314 are illustrated by two filling manners, which are only illustrated for distinguishing between them, and do not mean that the two portions are made of different materials. The glue overflowing portion is formed synchronously when the dispensed portion 314 is formed by dispensing glue.

In another situation, the dispensed portion 314 is just connected to the first groove 3122. As shown in FIG. 7e, the dispensed portion 314 on the right side of the functional element 313 is directly connected to the first reflective layer 312 without glue overflow.

Based on this, the driving backplate 31 provided in the embodiment of the present application defines the structure of the dispensed portion 314 as follows: at least part of the dispensed portion 314 is overlapped with the first reflective layer 312, and can be prepared by adopting a related dispensing process without a new process, so that the process is mature and simple, and the mass production is realized.

In addition, since the width Y of the dispensed portion 314 to be formed is wider, for the area where the gap between the side of the first opening 3121 and the functional element 313 is narrower, a portion of the dispensing glue will be overlapped with the first reflective layer 312 during the dispensing process. Meanwhile, a portion of the dispensing glue falls into the first opening 3121. At this time, a part of the dispensing glue overlapping the first reflective layer 312 flows into the first groove 3122, so that a height difference between the dispensing glue overlapping the first reflective layer 312 and the dispensing glue located in the first opening 3121 can be reduced, and a flow of the dispensing glue can be effectively reduced. Therefore, the probability of the overflow of the dispensing glue to the side of the functional element 313 is reduced, and a gap X is ensured between the outline of the dispensed portion 314 and the functional element 313, thereby effectively preventing poor light emission caused by the dispensing glue covering the functional element 313.

Moreover, under the condition that the dispensed portion 314 fills the entire first groove 3122 on the side close to the first reflective layer 312, the dispensed portion 314 is spliced with the first reflective layer 312 without a gap therebetween, so as to further improve the reflection efficiency of the driving backplate 31.

On the basis of the above structure, the number of the reflective layers on the driving backplate 31 can be adjusted according to different requirements for the reflective efficiency of the driving backplate 31.

Figure 8A:
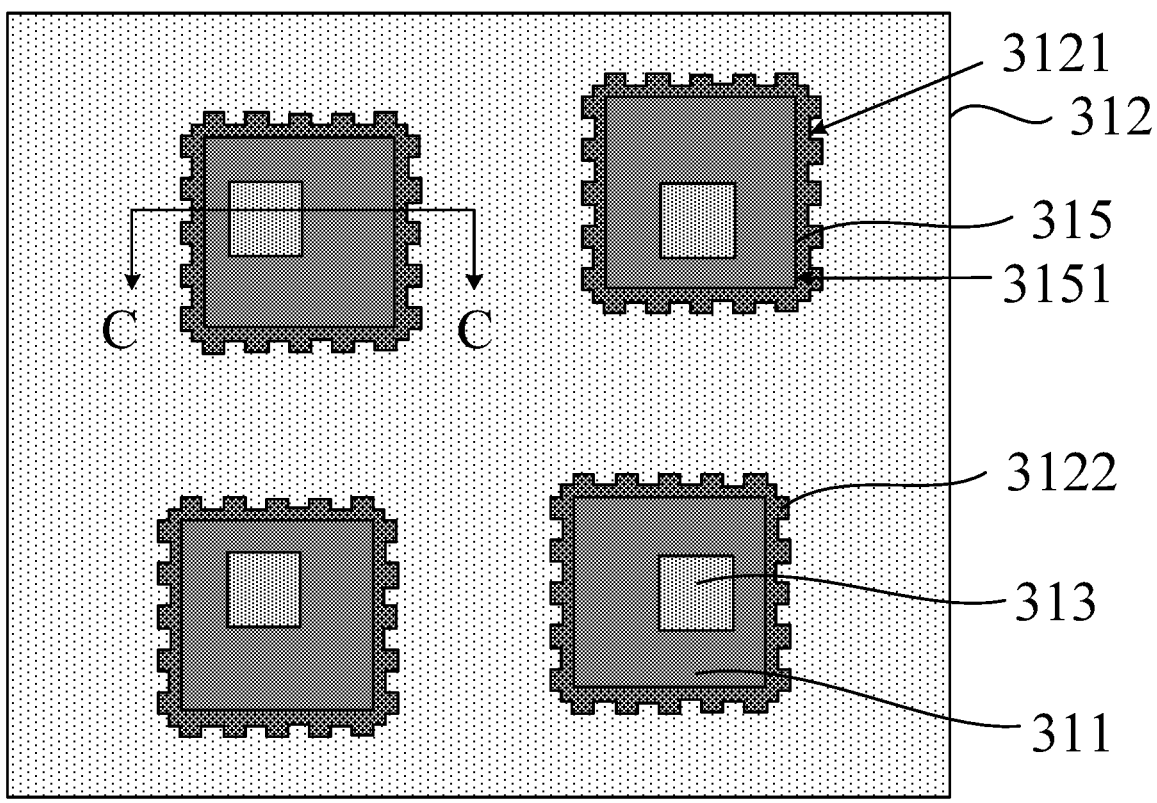
FIG. 8a is a diagram illustrating a positional relationship between a first reflective layer and a second reflective layer provided in an embodiment of the present application.

For example, as shown in FIG. 8a (FIG. 8a illustrates one second reflective layer 315 as an example), the driving backplate 31 further includes at least one second reflective layer 315.

Figure 8B:
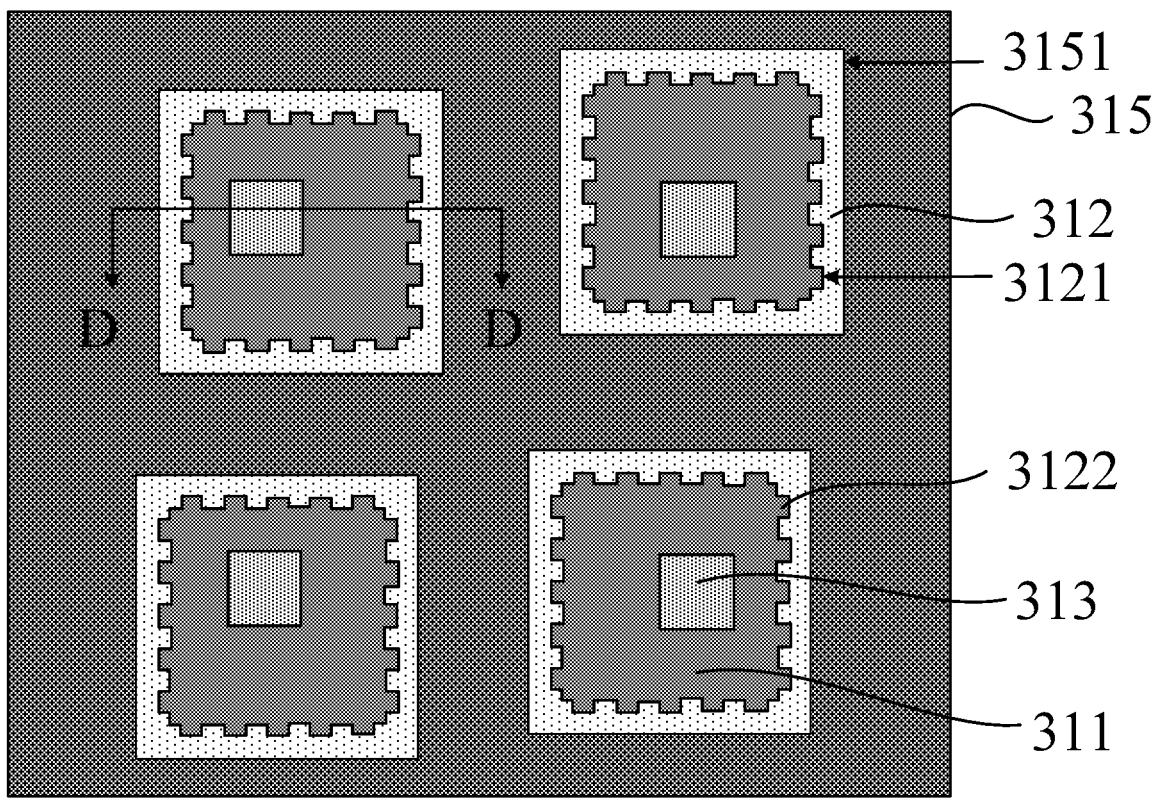
FIG. 8b is a diagram illustrating a positional relationship between a first reflective layer and a second reflective layer provided in an embodiment of the present application.

In one possible embodiment, as shown in FIGS. 8a and 8b, the driving backplate 31 further comprises a second reflective layer 315 on the basis of the first reflective layer 312.

Figure 8C:
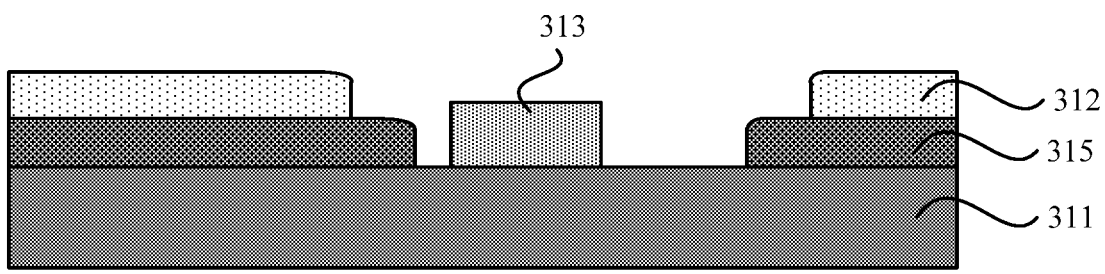

Regarding the position where the second reflective layer 315 is disposed, alternatively, as shown in FIG. 8c (a cross-sectional view taken along the direction C-C in FIG. 8a), the second reflective layer 315 is disposed on the side of the first reflective layer 312 close to the substrate 311. For example, the first reflective layer 312 is disposed on a surface of the second reflective layer 315.

The material and the manufacturing process of the second reflective layer 315 may be the same as those of the first reflective layer 312, and reference may be made to the above description about the material and the manufacturing process of the first reflective layer 312, which is not repeated herein.

Regarding the structure of the second reflective layer 315, optionally, as shown in FIG. 8a, the second reflective layer 315 has a plurality of second openings 3151, in which the first openings 3121 expose the second openings 3151, and the second openings 3151 expose the functional elements 313.

It is understood that the first opening 3121 exposes the second opening 3151. That is, the functional element 313 is disposed within an area enclosed by the first opening 3121 and the second opening 3151, and the outline of the first opening 3121 is distant from the functional element 313 with respect to the outline of the second opening 3151.

Thus, the first reflective layer 312 and the second reflective layer 315 can be prevented from being offset to cover the functional element 313, thereby affecting the light emitting efficiency of the functional element 313.

Figure 8D:
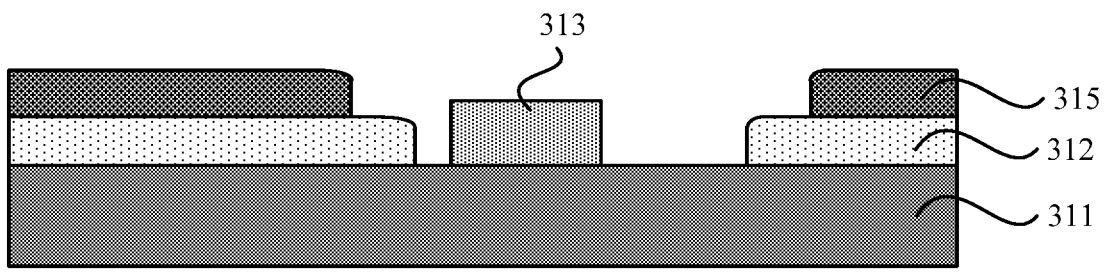
FIG. 8d is a cross-sectional view taken along the direction D-D of FIG. 8b.

Regarding the position where the second reflective layer 315 is disposed, alternatively, as shown in FIG. 8d (a cross-sectional view taken along the direction D-D in FIG. 8b), the second reflective layer 315 is disposed on the side of the first reflective layer 312 away from the substrate 311. For example, the second reflective layer 315 is disposed on a surface of the first reflective layer 312.

Regarding the structure of the second reflective layer 315, optionally, as shown in FIG. 8b, the second reflective layer 315 has a plurality of second openings 3151, the second openings 3151 are opposite to the first openings 3121, and the outline of the second openings 3151 is larger than the outline of the first openings 3121.

The outline of the second opening 3151 is larger than the outline of the first opening 3121, which can also be understood as the second opening 3151 exposing the first opening 3121.

It is understood that the second opening 3151 exposes the first opening 3121, and then the second opening 3151 necessarily exposes the functional element 313. That is, the functional element 313 is disposed within the area enclosed by the first opening 3121 and the second opening 3151, and the outline of the second opening 3151 is distant from the functional element 313 with respect to the outline of the first opening 3121.

Thus, the first reflective layer 312 and the second reflective layer 315 can be prevented from being offset to cover the functional element 313, thereby affecting the light emitting efficiency of the functional element 313.

The structure of the second opening 3151 on the second reflective layer 315 may be the same regardless of whether the first reflective layer 312 is disposed on the surface of the second reflective layer 315 as shown in FIG. 8c or the second reflective layer 315 is disposed on the surface of the first reflective layer 312 as shown in FIG. 8d.

Regarding the structure of the second opening 3151, in one possible embodiment, as shown in FIGS. 8a and 8b, the shape of the second opening 3151 is as follows: the outline is a closed shape with straight sides and an arbitrary shape. FIG. 8a is only an example of the second opening 3151 being rectangular, and is not limited thereto.

Figure 9A:
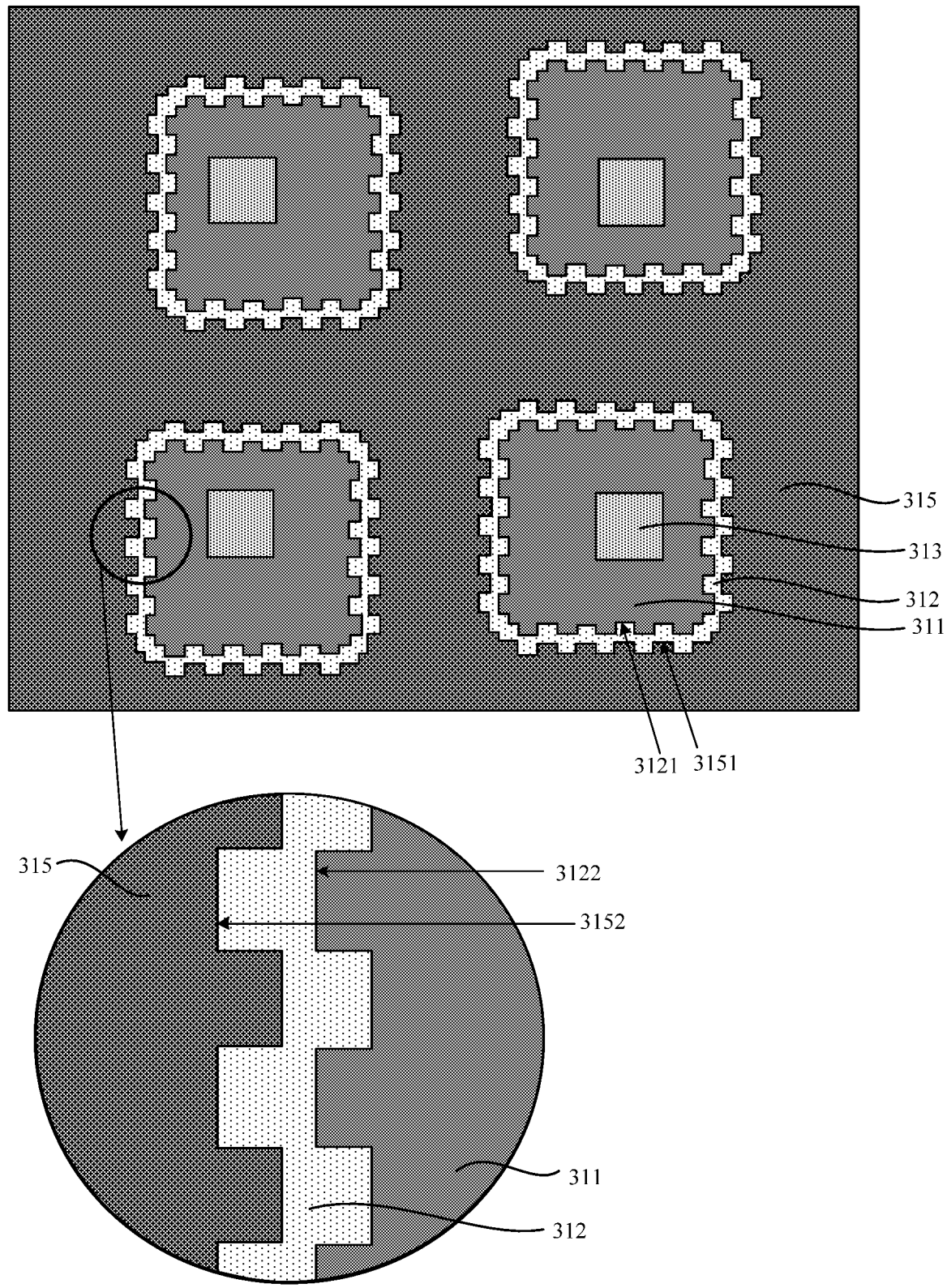
FIG. 9a is a schematic structural diagram of a first opening and a second opening provided in an embodiment of the present application.
Figure 9B:
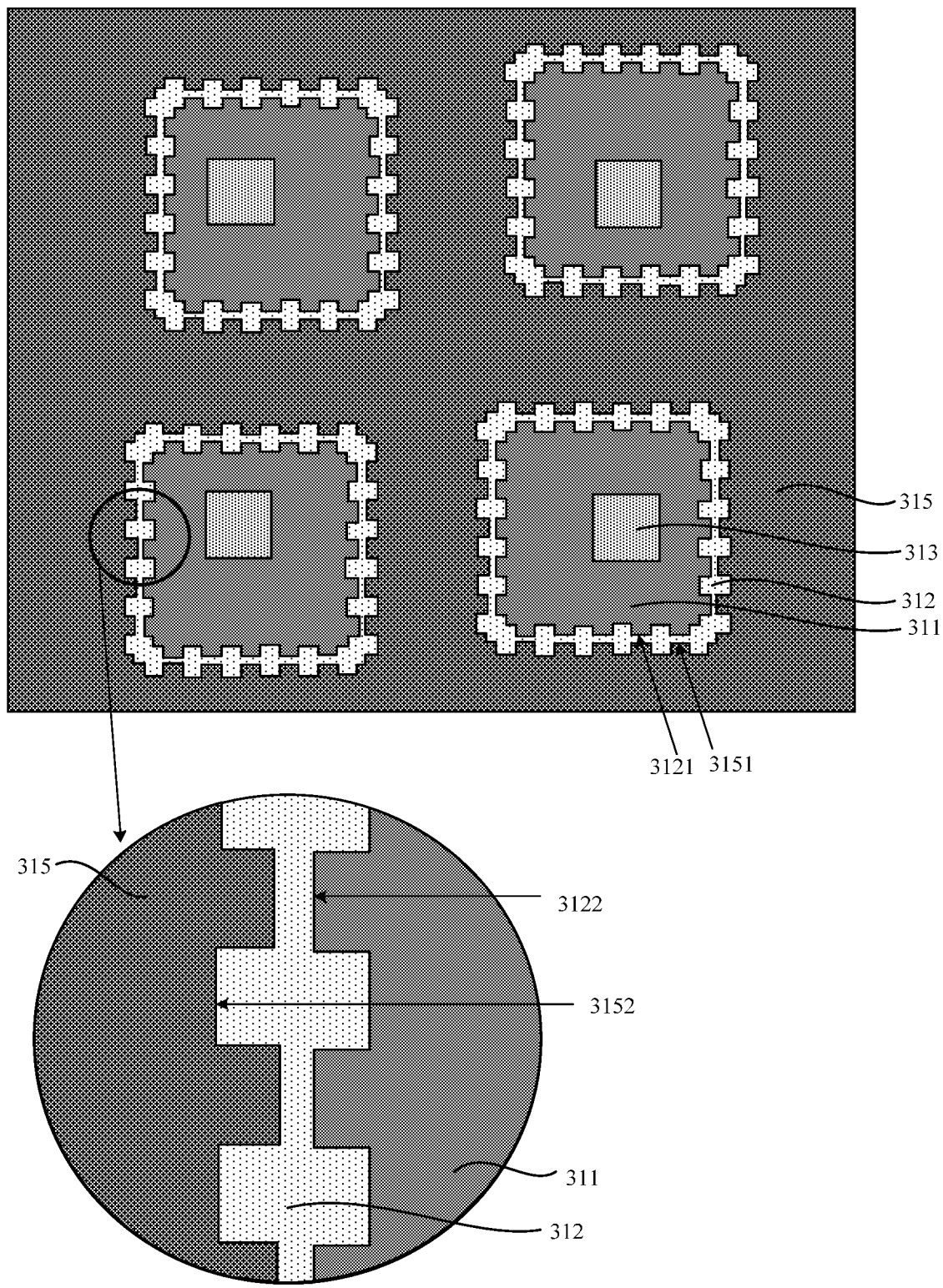
FIG. 9b is a schematic structural diagram of another first opening and a second opening provided in an embodiment of the present application.

Regarding the structure of the second opening 3151, in another possible embodiment, as shown in FIGS. 9a and 9b, the outline of the second opening 3151 includes a plurality of second grooves 3152.

The second groove 3152 is, for example, an open groove, or it is understood that the second groove 3152 extends through the second reflective layer 315. That is, the second groove 3152 extends in the layer thickness direction of the second reflective layer 315, and both ends of the second groove 3152 are open in the extending direction of the second groove 3152. The groove bottom of the second groove 3152 intersects (e.g., is perpendicular to) the first reflective layer 312.

Figure 9C:
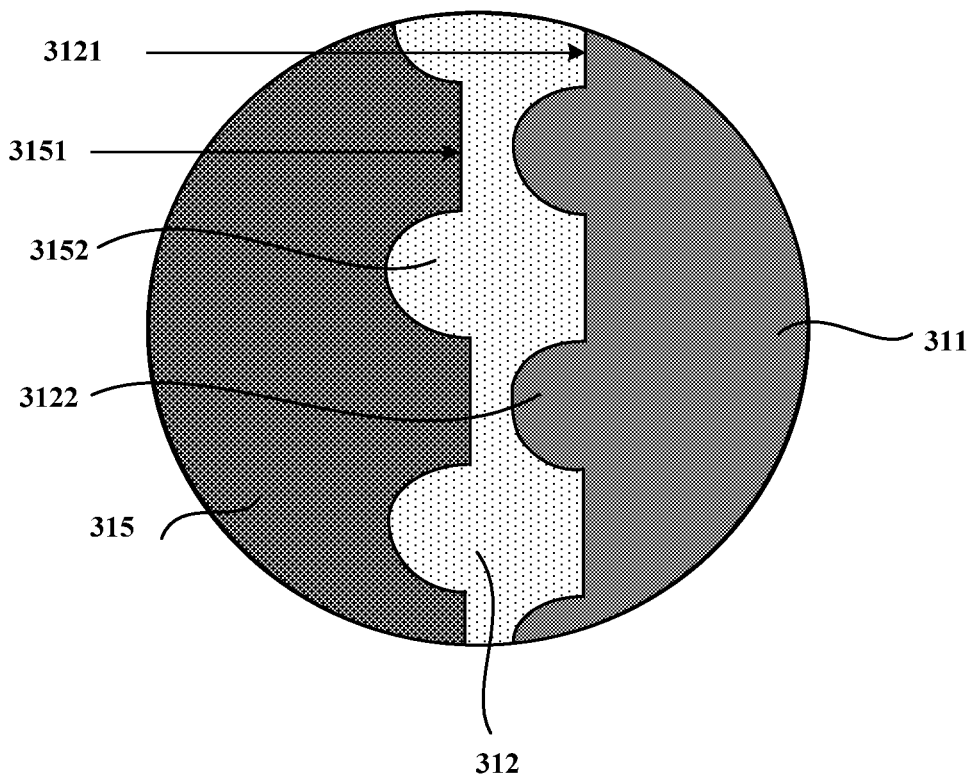
FIG. 9c is a schematic structural diagram of a second groove provided in an embodiment of the present application.
Figure 9D:
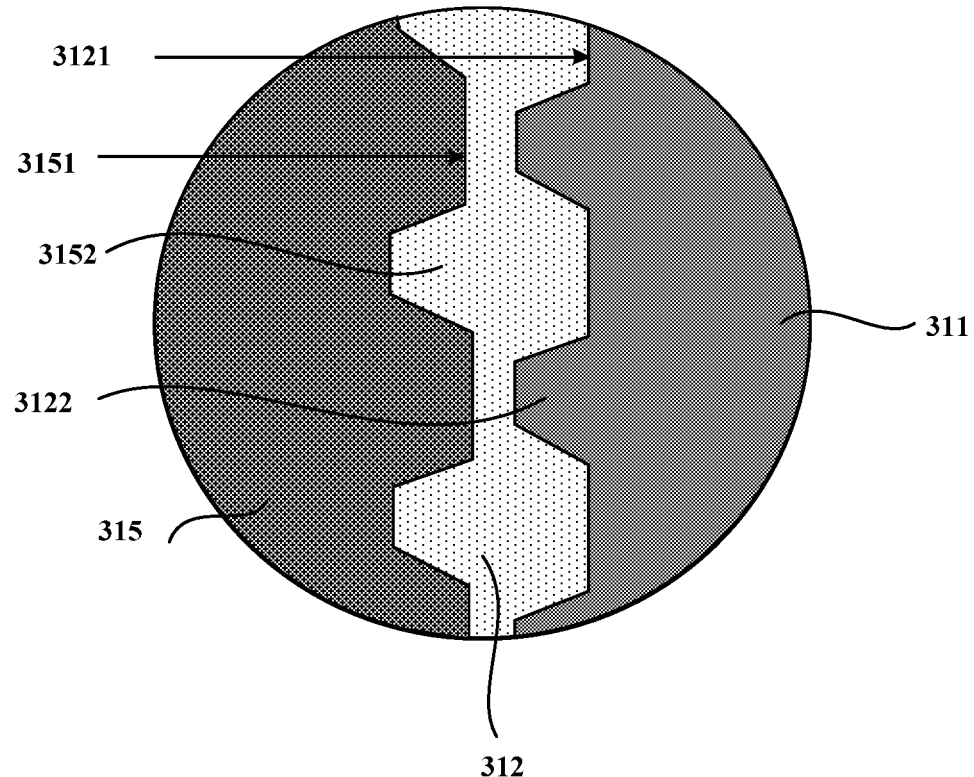
FIG. 9d is a schematic view of another second groove structure provided in an embodiment of the present application.

The shape of the second grooves 3152 may be at least one of a rectangular groove, a semicircular groove (as shown in FIG. 9c), and a trapezoidal groove (as shown in FIG. 9d). FIGS. 9a and 9b are only schematic diagrams illustrating that the second groove 3152 is a rectangular groove, and are not limited in any way.

In addition, the plurality of second grooves 3152 may be distributed on the outline of the second opening 3151 in an equally spaced arrangement, for example. Of course, other arrangements are possible.

In addition, optionally, as shown in FIG. 9a, the first groove 3122 and the second groove 3152 are arranged in an alignment manner.

That is, the first groove 3122 is disposed corresponding to the second groove 3152. Similarly, the gaps between the first grooves 3122 are disposed to correspond to the gaps between the second grooves 3152.

Alternatively, as shown in FIG. 9b, the first groove 3122 and the second groove 3152 are arranged in a staggered manner.

For example, as shown in FIG. 9b, the gaps between the first groove 3122 and the gaps between the second groove 3152 are correspondingly disposed. Similarly, the gaps between the second groove 3152 and the gaps between the first groove 3122 are correspondingly set (i.e., the first groove 3122 and the second groove 3152 are completely arranged in a staggered manner).

Figure 9E:
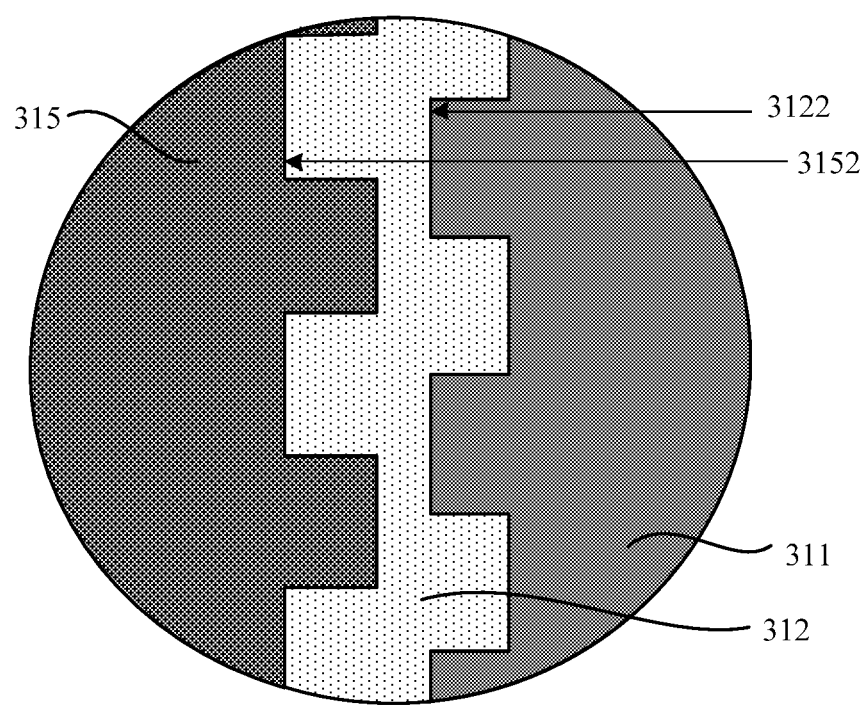
FIG. 9e is a schematic structural diagram of another first opening and a second opening provided in an embodiment of the present application.

Alternatively, for example, as shown in FIG. 9e, the first groove 3122 is partially disposed corresponding to the gap between the second grooves 3152, and partially disposed corresponding to the second grooves 3152; similarly, the second groove 3152 is partially disposed corresponding to the gap between the first groove 3122, and partially disposed corresponding to the first groove 3122 (i.e., the first groove 3122 and the second groove 3152 are partially arranged in a staggered manner).

Figure 10A:
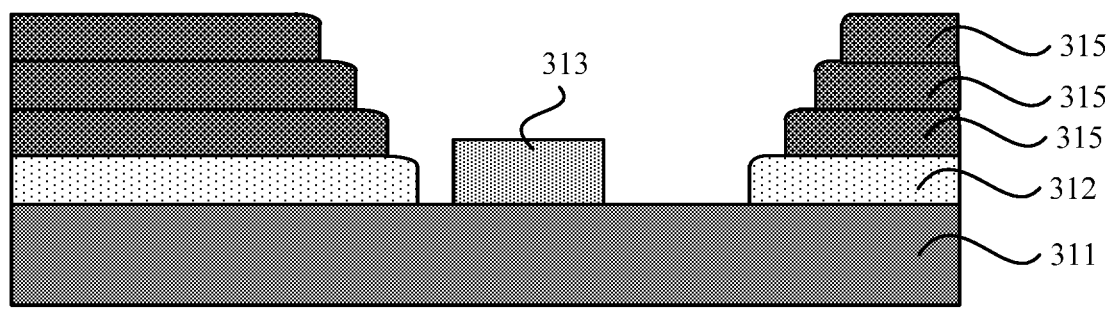
FIG. 10a is a schematic structural diagram of a second reflective layer provided in an embodiment of the present application.

In another possible embodiment, as shown in FIG. 10a, the driving backplate 31 further includes a plurality of second reflective layers 315 on the basis of the first reflective layer 312, and the plurality of second reflective layers 315 are stacked.

Regarding the structure of the second reflective layer 315, reference may be made to the above description of the second reflective layer 315, and details are not repeated herein.

As can be seen from the above description, as shown in FIG. 10a, a plurality of second reflective layers 315 may be disposed on a side of the first reflective layer 312 away from the substrate 311.

Figure 10B:
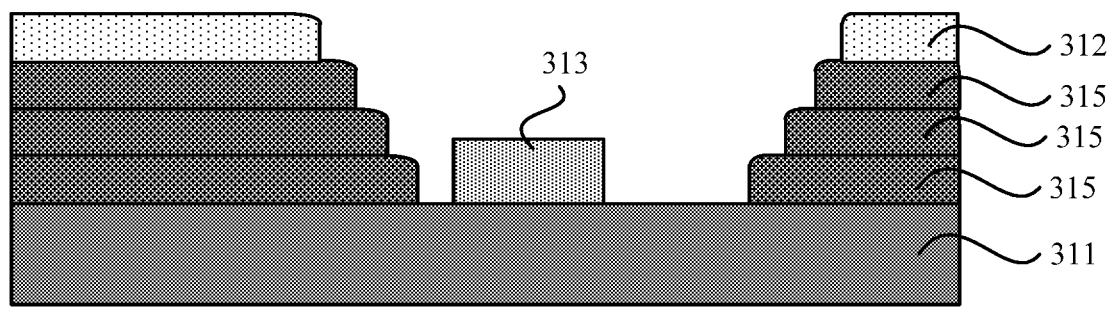
FIG. 10b is a schematic diagram of a second reflective layer provided in an embodiment of the present application.

Alternatively, as shown in FIG. 10b, a plurality of second reflective layers 315 may be disposed on the first reflective layer 312 on the side close to the substrate 311.

However, in either of the structure shown in FIG. 10a and the structure shown in FIG. 10b, in the direction away from the substrate 311, the distance from the outline of the second opening 3151 on the multilayer second reflective layer 315 to the functional element 313 increases in sequence.

That is, the second reflective layer 315 located above exposes the second reflective layer 315 located below.

Alternatively, it is understood that the second opening 3151 on the upper second reflective layer 315 has a larger opening area than the second opening 3151 on the lower second reflective layer 315.

The driving backplate 31 provided by the embodiment of this application, can improve the reflection efficiency of driving backplate 31, and satisfy the user's demand of high reflectivity by increasing the number of the reflection layers, that is, providing at least one layer of second reflective layer 315 on the basis of first reflective layer 312 on driving backplate 31.

Hereinafter, the structural relationship between the dispensed portion 314 and the second reflective layer 315 after the driving backplate 31 is further provided with the second reflective layer 315 will be described by taking an example in which the second reflective layer 315 is provided on the side of the first reflective layer 312 away from the substrate 311.

As can be seen from the above description, the distances between the sides of the first opening 3121 and the edges of the functional element 313 are not exactly equal, and the distances from the sides of the second opening 3151 to the sides of the first opening 3121 are fixed, which results in the distances between the sides of the second opening 3151 and the edges of the functional element 313 being not exactly equal.

Figure 11A:
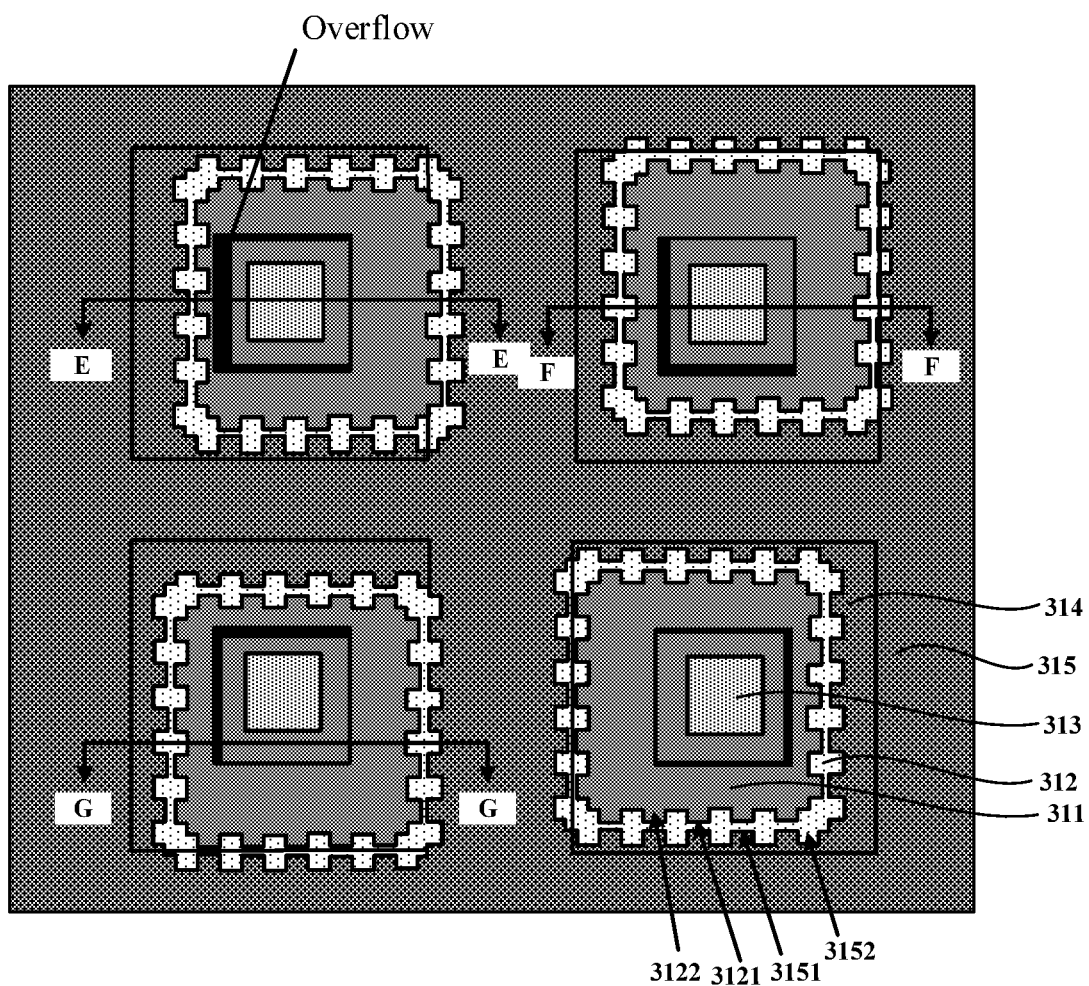
FIG. 11a is a top view of another driving plate provided in an embodiment of the present application.

Based on this, as shown in FIG. 11a, the distances between each side of the second opening 3151 and the edges of the functional element 313 are different, and the overlapping manners of the dispensed portion 314 and the first and second reflective layers 312 and 315 are also different.

Taking the dispensed portion 314 as a "loop" shape as shown in FIG. 11a as an example, the dispensed portion 314 and the second reflective layer 315 may have the following four positional relationships according to the difference between the distances between each side of the second opening 3151 and the edges of the functional element 313.

Figure 11B:
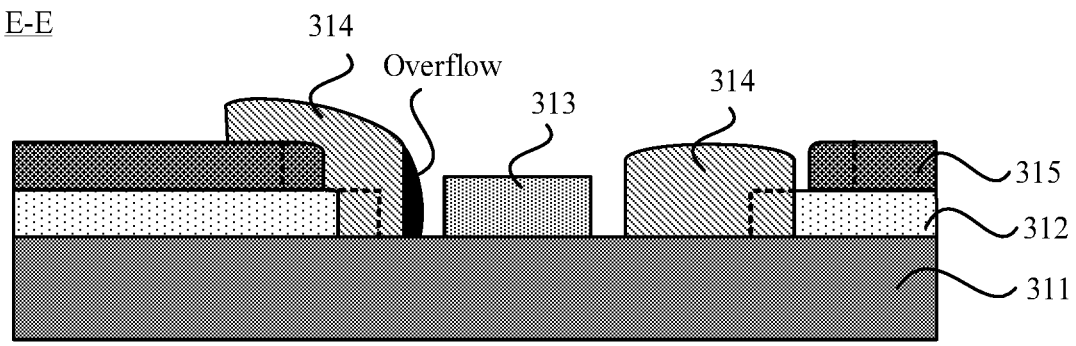

For example, as shown in FIG. 11b (a cross-sectional view taken along the direction E-E in FIG. 11a), the dispensed portion 314 on the left side of the functional element 313 is in a first possible positional relationship illustrated in the present application: the dispensed portion 314 fills the first opening 3121 (including the first groove 3122 on the first opening 3121) and the second opening 3151 (including the second groove 3152 on the second opening 3151), and overlaps the second reflective layer 315.

The dispensed portion 314 on the right side of the functional element 313 is in a second possible positional relationship illustrated in the present application: the dispensed portion 314 just fills the first opening 3121 (including the first groove 3122 on the first opening 3121).

Figure 11C:
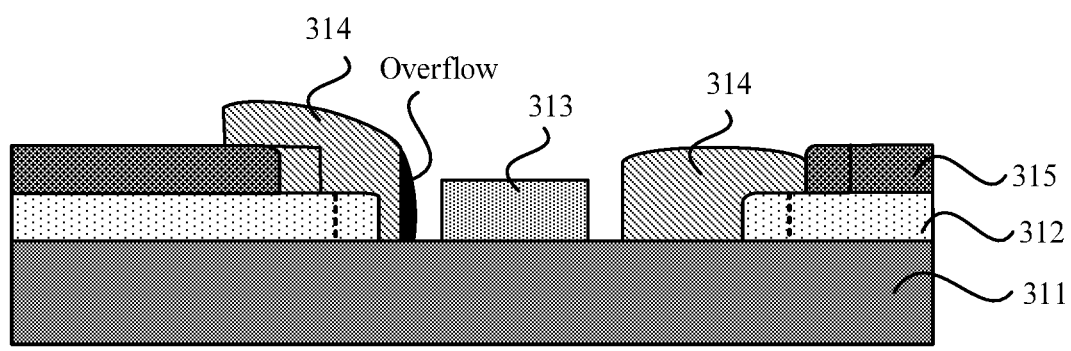

As shown in FIG. 11c (cross-sectional view along the direction F-F in FIG. 11a), the dispensed portion 314 located at the right side of the functional element 313 is in a third possible position relationship illustrated in the present application: the dispensed portion 314 fills the first opening 3121 (including the first groove 3122 on the first opening 3121), and overlaps the first reflective layer 312, but does not fill the second groove 3152, and does not overlap the second reflective layer 315.

Figure 11D:
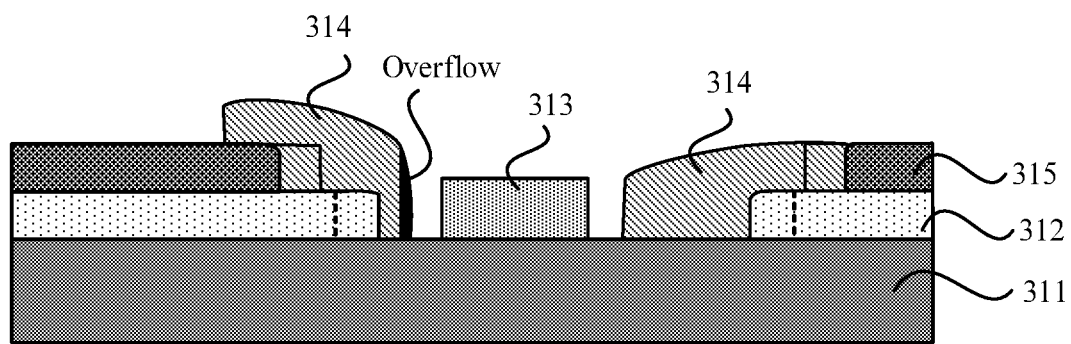

As shown in FIG. 11d (a cross-sectional view along the direction G-G of FIG. 11a), the dispensed portion 314 located at the right side of the functional element 313 is in a fourth possible position relationship illustrated in the present application: the dispensed portion 314 fills the first opening 3121, overlaps the first reflective layer 312, and fills the second opening 3151 (including the second groove 3152 on the second opening 3151), but does not overlap the second reflective layer 315.

Based on the above, the driving backplate 31 provided in the embodiment of the present application is provided with the second reflective layer 315, and the second groove 3152 is provided on the outline of the second opening 3151 on the second reflective layer 315. Thus, for the region with a narrow gap between the side of the second opening 3151 and the functional element 313, a part of the dispensing glue will overlap the second reflective layer 315 during the dispensing process. Meanwhile, a portion of the dispensing glue may fall into the second opening 3151. At this time, a portion of the dispensing glue overlapping the second reflective layer 315 flows into the second groove 3152. Compared with the case that the second groove 3152 is not formed in the outline of the second opening 3151, after the second groove 3152 is formed in the outline of the second opening 3151, part of the glue flows into the second groove 3152, so that the height difference between the glue overlapping the second reflective layer 315 and the glue in the second opening 3151 and the first opening 3121 can be further reduced, and the flow of the glue can be effectively reduced.

Alternatively, during dispensing, a portion of the dispensing glue overlaps the first reflective layer 312 but does not overlap the second reflective layer 315. At this time, the dispensing glue overlapping the first reflective layer 312 may flow into the second groove 3152. Compared with the case that the second groove 3152 is not formed in the outline of the second opening 3151, after the second groove 3152 is formed in the outline of the second opening 3151, a part of the glue flows into the second groove 3152, so that the height difference between the glue overlapping the first reflective layer 312 and the glue in the first opening 3121 can be further reduced, and the flow of the glue can be effectively reduced.

Therefore, the probability of the overflow of the dispensing glue to the side of the functional element 313 is reduced, and a gap X is ensured between the outline of the dispensed portion 314 and the functional element 313, thereby effectively preventing poor light emission caused by the dispensing glue covering the functional element 313.

On this basis, by arranging the first groove 3122 and the second groove 3152 in a staggered manner, filling spaces for uniformly distribute the redundant dispensing glue can be provided, so that the filling effect of the dispensing glue in the first groove 3122 and the second groove 3152 is better.

The above description is only for the specific embodiments of the present disclosure, but the scope of the present disclosure is not limited thereto, and any person skilled in the art can easily think of the changes or substitutions within the technical scope of the present disclosure, and shall cover the scope of the present disclosure. Therefore, the protection scope of the present disclosure should be limited by the protection scope of the claims.

What is claimed is:

1. A driving backplate comprising:
   a substrate;
   a first reflective layer disposed on the substrate; the first reflective layer is provided with a plurality of first openings; an outline of the first opening comprises a plurality of first grooves;
   a functional element disposed within the first openings; and
   a dispensed portion arranged at a periphery of the functional element, and at least part of the first groove is filled by one side of the dispensed portion close to the first reflective layer,
   wherein the driving backplate further comprises at least one second reflective layer;
   the second reflective layer is arranged on one side of the first reflective layer away from the substrate;
   the second reflective layer is provided with a plurality of second openings, the second openings are opposite to the first openings, and an outline of the second opening is larger than the outline of the first opening.

2. The driving backplate according to claim 1, wherein at least a portion of the dispensed portion overlaps the first reflective layer.

3. The driving backplate according to claim 2, wherein a gap is formed between the dispensed portion and the functional element.

4. The driving backplate according to claim 1, wherein the outline of the second opening comprises a plurality of second grooves.

5. The driving backplate according to claim 4, wherein the second grooves are in an equally spaced arrangement.

6. The driving backplate according to claim 4, wherein the plurality of the second grooves are shaped as at least one of rectangular grooves, semicircular grooves, or trapezoidal grooves.

7. The driving backplate according to claim 4, wherein the first grooves and the second grooves are arranged in a staggered manner.

8. The driving backplate according to claim 1, wherein the first grooves are in an equally spaced arrangement.

9. The driving backplate according to claim 1, wherein the plurality of the first grooves are shaped as at least one of rectangular grooves, semicircular grooves, or trapezoidal grooves.

10. The driving backplate according to claim 1, wherein the at least one second reflective layer has a plurality of second reflective layers;
    distance from the outline of the second opening of each of the plurality of second reflective layers to the functional element increases in a direction away from the substrate.

11. The driving backplate according to claim 1, wherein the first reflective layer is a white ink layer or a white reflective layer.

12. The driving backplate according to claim 1, wherein a material of the dispensed portion is glue having high reflective property.

13. A display device comprising a driving backplate, the driving backplate comprising:
    a substrate;
    a first reflective layer disposed on the substrate; the first reflective layer is provided with a plurality of first openings; an outline of the first opening comprises a plurality of first grooves;
    a functional element disposed within the first opening; and
    a dispensed portion arranged at a periphery of the functional element, and at least part of the first groove is filled by one side of the dispensed portion close to the first reflective layer,
    wherein the driving backplate further comprises at least one second reflective layer;
    the second reflective layer is arranged on one side of the first reflective layer away from the substrate;
    the second reflective layer is provided with a plurality of second openings, the second openings are opposite to the first openings, and an outline of the second opening is larger than the outline of the first opening.

14. The display device according to claim 13, wherein at least a portion of the dispensed portion overlaps the first reflective layer, and/or
    a gap is formed between the dispensed portion and the functional element.

15. The display device according to claim 13, wherein the outline of the second opening comprises a plurality of second grooves.

16. The display device according to claim 15, wherein the plurality of second grooves in an equally spaced arrangement, and/or
    the plurality of the second grooves are shaped as at least one of rectangular grooves, semicircular grooves, or trapezoidal grooves.

17. The display device according to claim 15, wherein the first grooves and the second grooves are arranged in a staggered manner.

18. The display device according to claim 13, wherein the first grooves are in an equally spaced arrangement, and/or
    the plurality of the first grooves are shaped as at least one of rectangular grooves, semicircular grooves, or trapezoidal grooves.

* * * * *